United States Patent
Ejima et al.

(10) Patent No.: US 6,342,900 B1
(45) Date of Patent: Jan. 29, 2002

(54) INFORMATION PROCESSING APPARATUS

(75) Inventors: Satoshi Ejima, Tokyo-to; Akihiko Hamamura, Chiba, both of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 08/972,738

(22) Filed: Nov. 18, 1997

Related U.S. Application Data

(60) Provisional application No. 60/033,704, filed on Dec. 20, 1996.

(30) Foreign Application Priority Data

Dec. 6, 1996 (JP) .............................................. 8-326547
May 13, 1997 (JP) .............................................. 9-122011

(51) Int. Cl.$^7$ .......................... G09G 5/00; H04N 5/222
(52) U.S. Cl. ...................... 345/698; 345/629; 345/640; 348/333.01
(58) Field of Search ................................ 345/113, 114, 345/132, 629, 640, 698; 348/589, 584, 600–601, 333.01

(56) References Cited

U.S. PATENT DOCUMENTS

| | | | | |
|---|---|---|---|---|
| 4,599,610 A | * | 7/1986 | Lacy ........................... | 345/113 |
| 4,661,811 A | * | 4/1987 | Gray et al. .................. | 345/113 |
| 4,757,470 A | * | 7/1988 | Bruce et al. ................. | 345/435 |
| 5,093,798 A | * | 3/1992 | Kita ............................. | 345/113 |
| 5,179,642 A | * | 1/1993 | Komatsu ..................... | 345/435 |
| 5,414,471 A | * | 5/1995 | Saitoh et al. ................ | 348/565 |
| 5,648,760 A | | 7/1997 | Kumar | |
| 5,687,306 A | * | 11/1997 | Blank .......................... | 345/435 |
| 5,689,610 A | * | 11/1997 | Manico et al. .............. | 348/552 |
| 5,805,149 A | * | 9/1998 | Yuki et al. ................... | 345/132 |
| 5,987,150 A | * | 11/1999 | Coppinger ................... | 345/589 |

* cited by examiner

*Primary Examiner*—Jeffery Brier
*Assistant Examiner*—Anthony J. Blackman
(74) *Attorney, Agent, or Firm*—Oliff & Berridge PLC

(57) ABSTRACT

An information processing apparatus and method are provided to determine whether to display line drawings according to the size and number of pixels of the display screen. The screen may be divided into nine areas and the images are displayed in each area. When line-drawing information related to the displayed images exists, a determination is made as to whether to display those line drawings superimposed on the images based on the size of the divided areas and the number of pixels therein. When it is anticipated that it is not possible to discriminate the line drawings when displayed, display of the line drawings is not performed and marks (M) indicating that the line-drawing information exists are instead displayed.

27 Claims, 12 Drawing Sheets

2x2 PIXEL AREA

| a | b | a | b | a | b | a | b |
|---|---|---|---|---|---|---|---|
| c | d | c | d | c | d | c | d |
| a | b | a | b | a | b | a | b |
| c | d | c | d | c | d | c | d |
| a | b | a | b | a | b | a | b |
| c | d | c | d | c | d | c | d |

CCD 20

FIG. 7

3x3 PIXEL AREA

| a | b | c | a | b | c | a | b | c |
|---|---|---|---|---|---|---|---|---|
| d | e | f | d | e | f | d | e | f |
| g | h | i | g | h | i | g | h | i |
| a | b | c | a | b | c | a | b | c |
| d | e | f | d | e | f | d | e | f |
| g | h | i | g | h | i | g | h | i |

CCD 20

FIG. 8

| FIG. 14(A) |
| FIG. 14(B) |

INFORMATION PROCESSING APPARATUS

RELATED PROVISIONAL APPLICATION

This nonprovisional application claims the benefit of U.S. Provisional Application No. 60/033,704, filed Dec. 20, 1996.

INCORPORATION BY REFERENCE

The disclosures of the following priority applications are herein incorporated by reference: Japanese Application No. 08-326547, filed Dec. 6, 1996; and Japanese Application No. 09-122011, filed May 13, 1997.

BACKGROUND OF THE INVENTION

1. Field of Invention

The present invention relates to an information processing apparatus and more particularly to an information processing apparatus that determines whether to display images based on the types of images and the sizes of the display screens.

2. Description of Related Art

Electronic cameras photograph images of objects using a CCD and convert the images into digital data. The digital data is recorded in internal memory and removable memory cards. These electronic cameras have replaced cameras using film. The images photographed using these electronic cameras can be reproduced on the spot and displayed on LCD or CRT screens without development and printing as in conventional cameras.

These cameras are capable of inputting not only images, but also sounds. Furthermore, they may be capable of inputting handwritten memos. In that case, the sounds and memos may be related to images. In this manner, they are capable of recording sounds during photography, and recording simple comments with handwritten characters corresponding to the places of photography and the photographed objects.

These cameras may display multiple images by dividing the screen into multiple areas.

However, when recording memo information in addition to image information, and when displaying multiple images and memos by dividing the screen, it may be difficult to discriminate the handwritten memos because each display area of the divided screen is small.

SUMMARY OF THE INVENTION

The present invention increases the efficiency of processing by determining whether to display the images based on the types of images and the sizes of the display screens.

The information processing apparatus may include a memory (e.g., a memory card) that stores first images and second images and a display control device (e.g., a CPU) that displays the first images and the second images on the specified screens. The display control device has a first mode that displays the first images on the screens in a first size corresponding to a first number of pixels and a second mode that displays the first images on the screens in a second size corresponding to a second number of pixels, which is less than the first number of pixels. The second images are displayed superimposed on the first images when the first images have been displayed on the screen in the first mode and when the second images related to the first images have been stored by the memory.

The display control device may have a symbol indicating the existence of the second images relating to the first images displayed on the screen when the first images are displayed on the screen in the second mode and when the second images related to the first images have been stored by the memory.

The first images may be displayed in a plurality of display areas when displaying a plurality of the first images. When second images related to the first images have been stored by the memory, the second images related to the first images are displayed based on sizes of the display areas.

When the first images are displayed on the screens, the display control device determines whether to have the second images displayed superimposed on the first images based on sizes of the screens.

The first images may be photographic images and the second images may be line drawings.

The information processing apparatus may further include a display device (e.g., a LCD) that displays the first images and the second images.

In one embodiment, the information processing apparatus may include a display device (e.g., a LCD) that displays first images and second images and a display control device (e.g., a CPU) capable of having the second images displayed superimposed on the first images. The display control device may have the first images displayed in a plurality of sizes. The display control device may control whether to display the second images superimposed on the first images according to sizes in which the first images are displayed.

The display control device may not display the second image when the size of the first image is less than or equal to a first reference value or when the number of pixels of the first image is equal to or less than a second reference value.

A program may be recorded on a recording medium to be used in an information processing apparatus. The control program may be used for storing a first image and second image. The program may further display the first image and the second image on a given screen. The program controls the information processing apparatus such that it operates in one of (1) a first mode in which the first image is displayed on the screen in a size corresponding to a first pixel number, and (2) a second mode in which the first image is displayed on the screen in a second size corresponding to a second pixel number smaller than the first pixel number. The information processing apparatus may be controlled such that, in the event the first image is displayed on the screen in the first mode, when the second image related to the first image is stored in memory, the second image is displayed on the screen superimposed on the first image.

The memory may store first images and second images. The display control device may have the first images and the second images displayed on the specified screens. The display control device may have a first mode that displays the first images on the screens in a first size corresponding to a first number of pixels and a second mode that displays the first images on the screens in a second size corresponding to a second number of pixels less than the first number of pixels. When the first images have been displayed on the screens in the first mode and when the second images related to the first images have been stored by the memory, the second images are displayed superimposed on the first images.

The display control device may have the second images displayed superimposed on the first images. The display control device may have the first images displayed in a plurality of sizes and control whether to display the second images superimposed on the first images according to sizes in which the first images are displayed.

In the recording medium, the display control device may control the information processing apparatus such that it operates in one of the first mode which displays the first image on the screen in a first size which corresponds to the first pixel number and the second mode which displays the first image on the screen in a second size which corresponds to a second pixel number smaller than a first pixel number. If the first image is displayed on the screen in the first mode and if the second image which relates to the first image is stored in memory, then the second image is displayed on the screen superimposed on the first image.

Other objects, advantages and salient features of the invention will become apparent from the following detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements, and wherein:

FIG. 7 shows a first thinning process;

FIG. 8 shows a second thinning process;

DETAILED DESCRIPTION OF PREFERRED EMBODIMENTS

Figure 1:
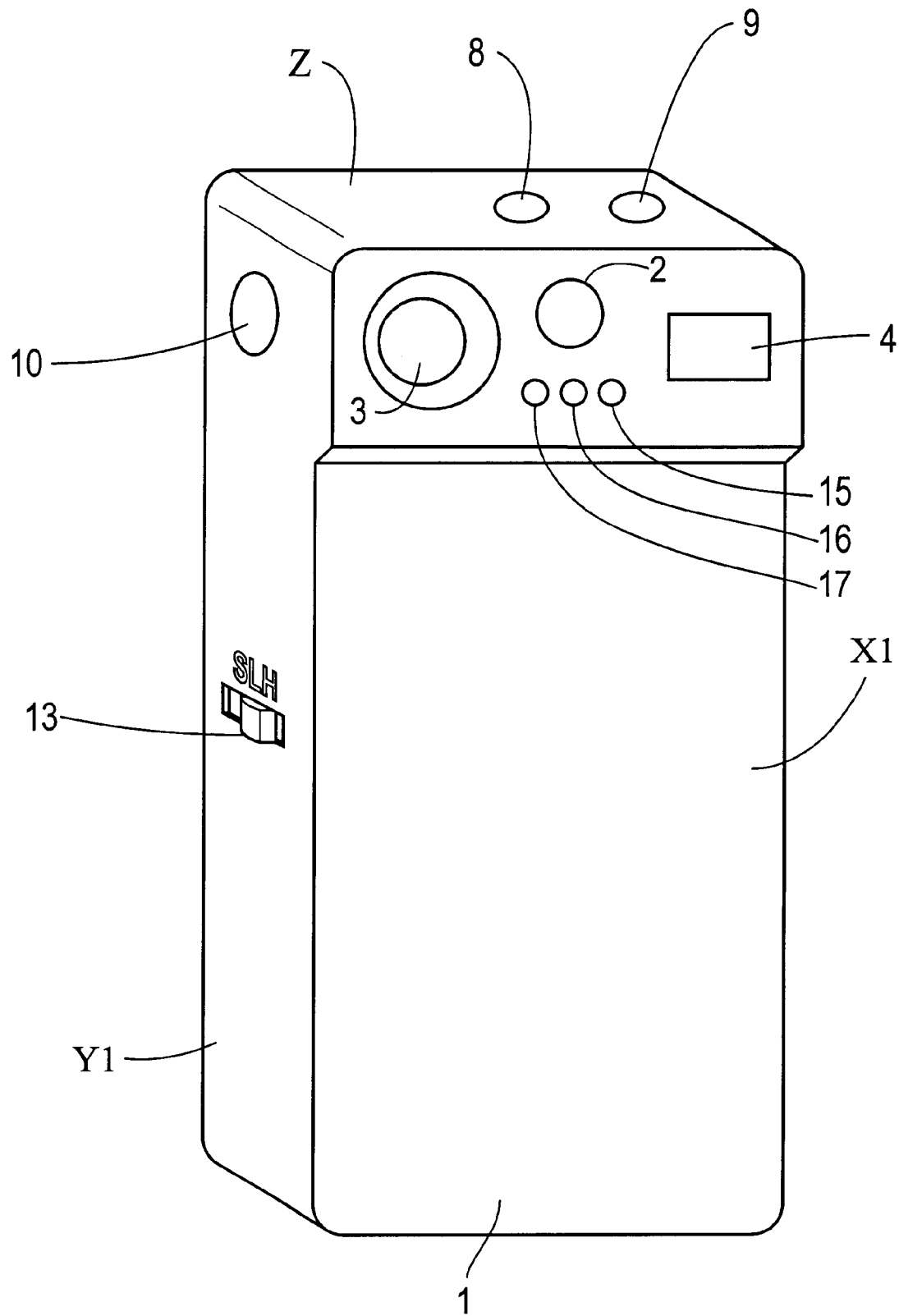
FIG. 1 is a front perspective drawing of one preferred embodiment of the electronic camera in accordance with the present invention.
Figure 2:
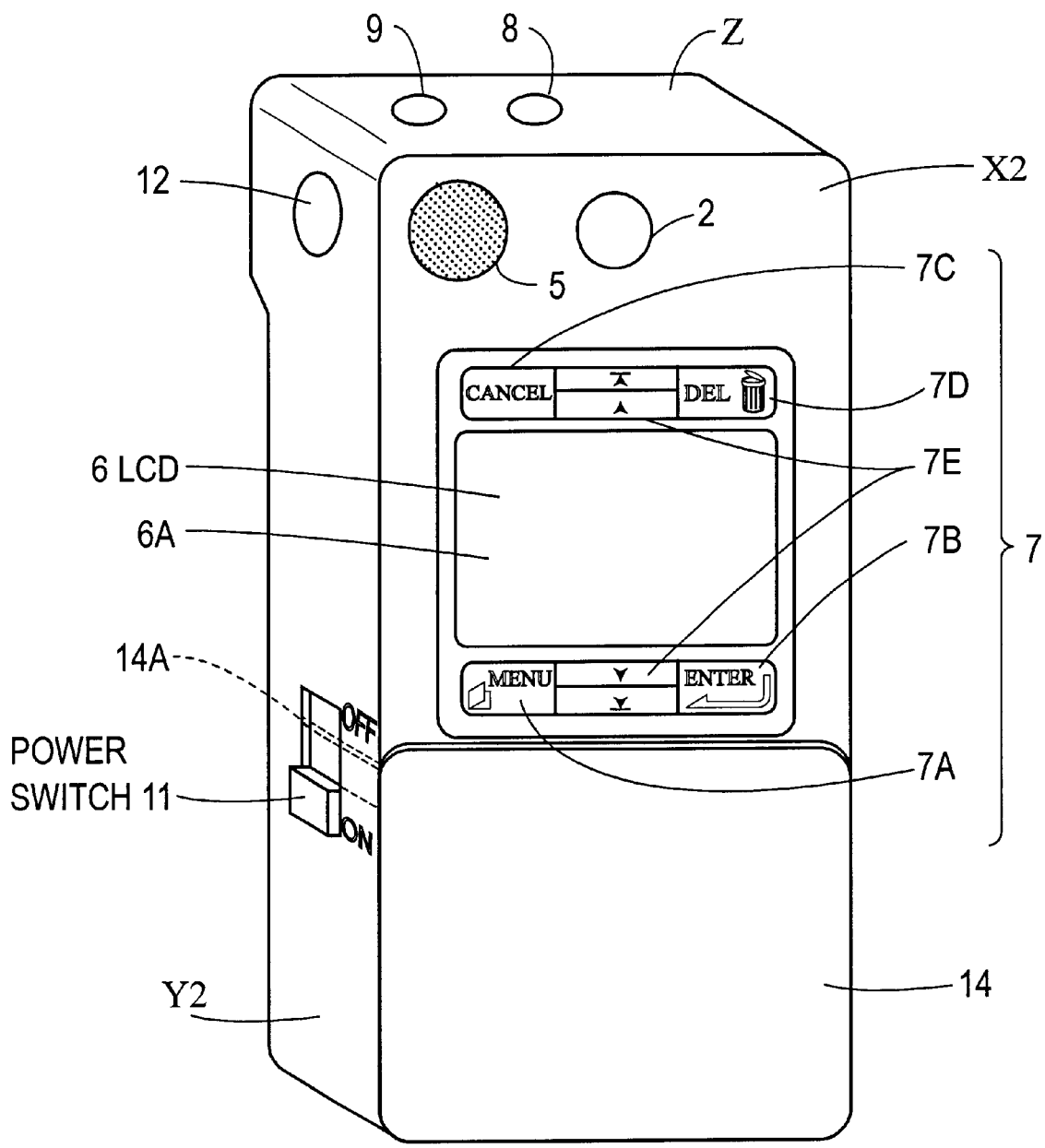
FIG. 2 is a rear perspective drawing showing the open status of the LCD cover.

FIGS. 1 and 2 show the structure of one preferred embodiment of the electronic camera in accordance with the present invention. Face X1 is oriented toward the object when photographing an object. Face X2 is oriented toward the user. A viewfinder 2 is provided on the upper end of face X1 to confirm the photographic range of the object. A photographic lens 3 that takes in the light image of the object and a flash component (strobe) 4 that illuminates the object are also provided on face X2.

Furthermore, a red-eye reduction (RER) LED 15 is provided on face X1 such that when performing photography by making the strobe 4 flash, it reduces red-eye by emitting light before the strobe 4 flashes. A photometry device 16 performs photometry when the CCD 20 (FIG. 4) is suspended. A colorimetry device 17 performs colorimetry when the CCD 20 is suspended.

Meanwhile, viewfinder 2 and speaker 5 are provided on the upper end of face X2 opposite face X1. Speaker 5 outputs a sound corresponding to the sound data recorded on the memory card that is installed in the electronic camera 1. An LCD 6 and operating keys 7 on face X2 are vertically below the viewfinder 2, photographic lens 3, flash component 4 and speaker 5. A touch tablet 6A is provided on the surface of the LCD 6 such that positions indicated by contact operations of a pen-type pointing device are input as information.

The touch tablet 6A is made of a transparent material such as glass, resin or the like. The user can observe the images displayed to the LCD 6 formed beneath the touch tablet 6A.

The operating keys 7 are keys operated when reproducing and displaying recorded data to the LCD 6. The keys 7 sense operations of the user and provide them to the CPU 39.

The menu key 7A is operated when displaying menu screens to the LCD 6. The execute (run) key 7B is operated when reproducing the recorded information selected by the user.

The cancel key 7C is operated when deleting recorded data. The delete key 7D is operated when deleting recorded data. The scroll key 7E is operated when scrolling the screens up and down when lists of the recorded data are displayed on the LCD 6.

Figure 3:
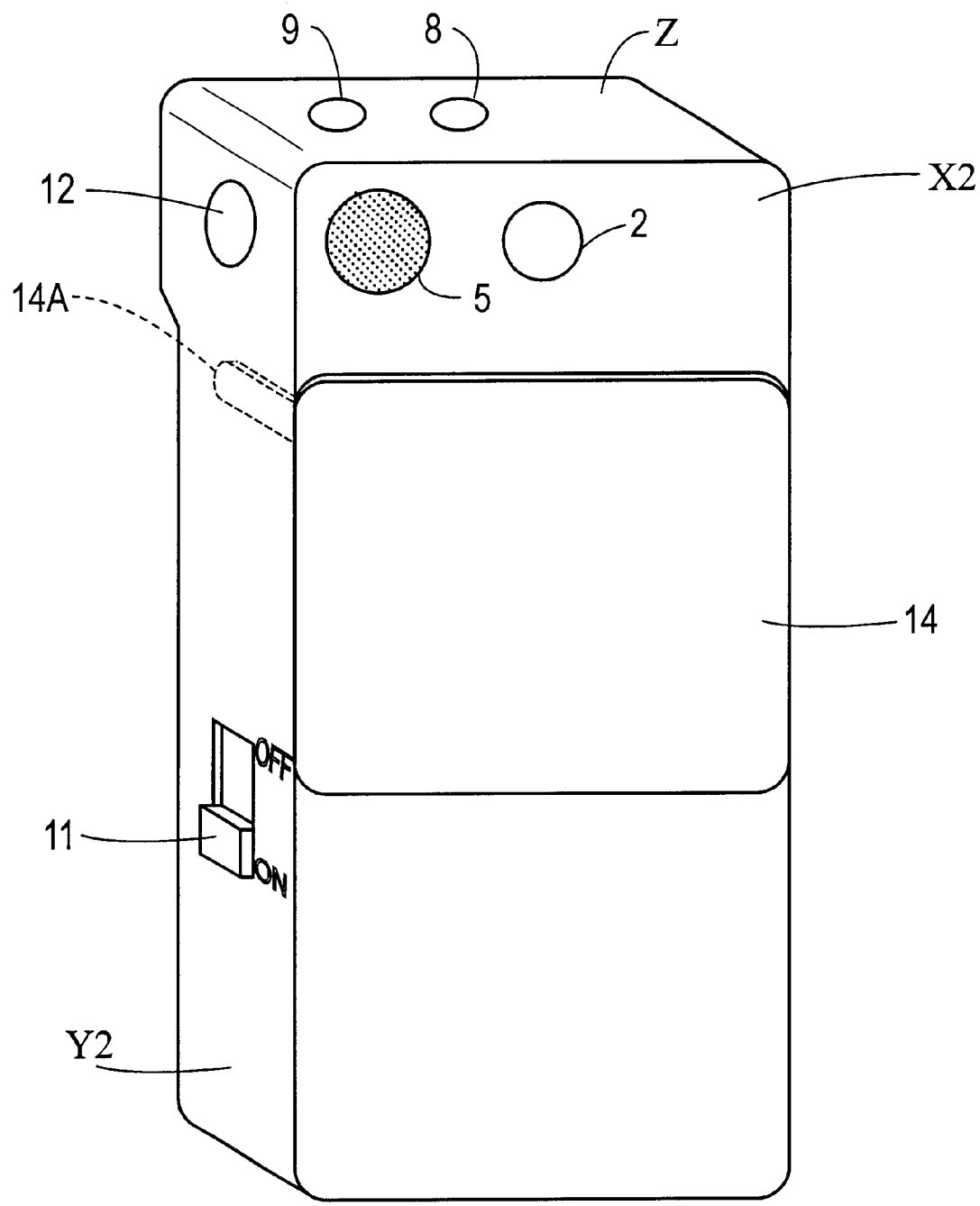
FIG. 3 is a rear perspective drawing showing the closed status of the LCD cover.

Freely slideable LCD cover 14 is provided on face X2 to protect the LCD 6 when not in use. When the LCD cover 14 is moved vertically upward (FIG. 3), it covers the tCD 6 and the touch tablet 6A. When the LCD cover 14 is moved vertically downward, the LCD 6 and touch tablet 6A are exposed and a power switch 11 on face Y2 is switched ON by an arm 14A of the LCD cover 14.

A microphone 8 that collects sounds and an earphone jack 9 for connecting an earphone are provided on face Z.

A release switch 10 is provided on face Y1 to photograph objects. A continuous mode switch 13 is operated when switching to the continuous mode during photography. The release switch 10 and continuous mode switch 13 are vertically below the viewfinder 2, photographic lens 3 and flash component 4 provided on the upper end of face X1.

Meanwhile, a sound recording switch 12 operated when recording sounds and a power switch 11 that switches the power supply ON and OFF are provided on face Y2 opposite face Y1. The sound recording switch 12 and power switch 11 are vertically below the viewfinder 2, photographic lens 3 and flash component 4 provided on the upper end of face X1. The sound recording switch 12 may be formed at nearly the same height as the release switch 10 on face Y1 and may be formed such that there is no feeling of incongruity when held by either the left or right hand.

Alternatively, different heights of the sound recording switch 12 and the release switch 10 can be provided such that one switch is not accidentally pressed when pressing a switch on the other side.

The continuous mode switch 13 may be used to photograph the object in only one frame or to photograph it in a fixed plurality of frames when the user photographs the object by pressing the release switch 10. For example, when the continuous mode switch 13 is switched to the position "S" (i.e., switched to S mode), only one frame of photography is performed during the period when the release switch 10 is pressed.

Also, when the continuous mode switch 13 is switched to the position "L" (i.e., switched to L mode), photography of 8 frames per second is performed during the period when the release switch 10 is pressed (i.e., low-speed continuous mode photography is performed).

Furthermore, when the continuous mode switch 13 is switched to the position "H" (i.e., switched to H mode), photography of 30 frames per second is performed during the period when the release switch 10 is pressed (i.e., high-speed continuous mode photography is performed).

Figure 4:
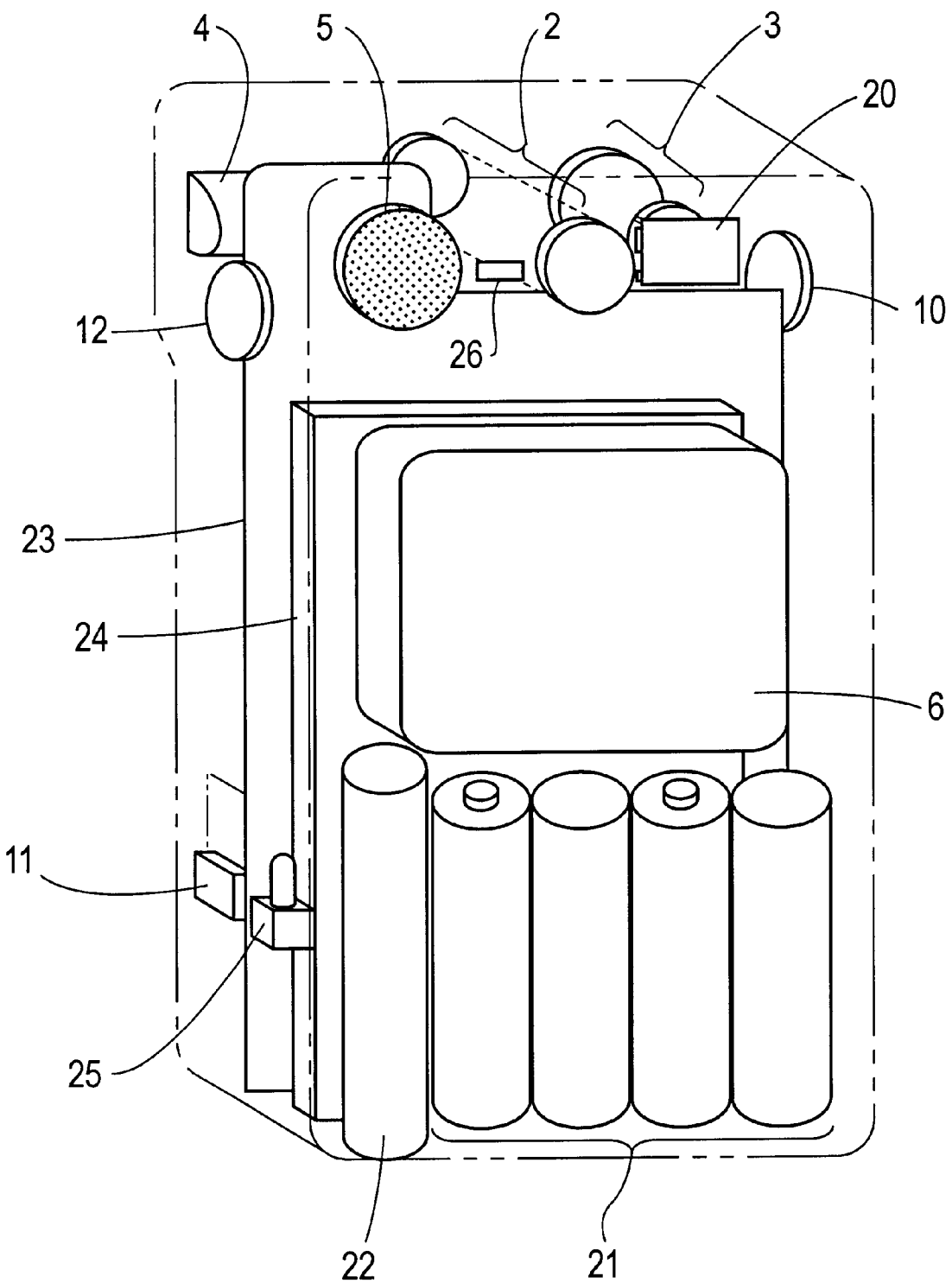
FIG. 4 shows an internal configuration of the electronic camera.

The internal structure of the electronic camera 1 will now be explained with reference to FIG. 4. A CCD 20 is provided behind (on face X2) the photographic lens 3 to photoelectrically convert the light images of the objects formed via the photographic lens 3 into electrical (image) signals.

An in-viewfinder display 26 is placed inside the visual field of the viewfinder 2 to display the setting status of various functions for the user viewing the object through the viewfinder 2.

Four cylindrical batteries (size AA dry cells) 21 may be arranged vertically below the LCD 6. The electric power accumulated in these batteries 21 may be supplied to each component. Also, a condenser 22 that accumulates the load required when the flash component 4 flashes may be located alongside the batteries 21.

Various control circuits may be formed on circuit board 23 to control each component of the electronic camera 1. A removable memory card 24 may be provided between the circuit board 23 and the LCD 6 and batteries 21. The information input into the electronic camera 1 may be recorded in predefined areas of the memory card 24.

An LCD switch 25 adjacent to the power switch 11 is placed in the ON state while its plunger is depressed. When the LCD cover 14 is moved vertically downward as in FIG. 5A, the LCD switch 25 is switched ON along with the power switch 11 by the arm 14A of the LCD cover 14.

Figure 5:
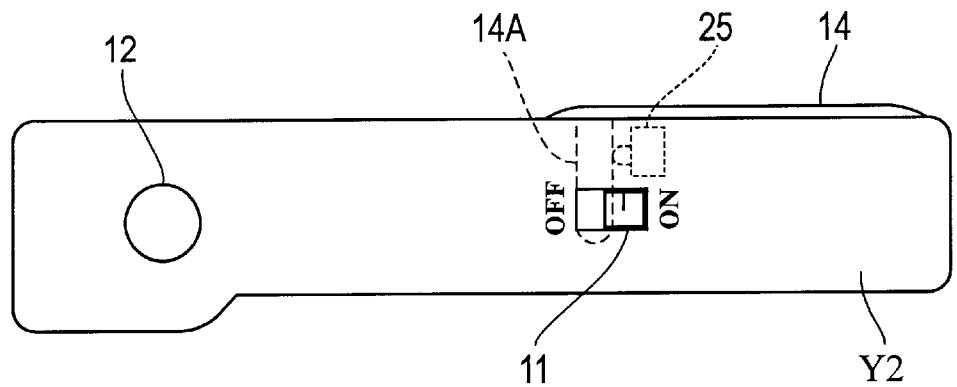
FIGS. 5A–5C are side views showing an LCD switch and the LCD cover.
Figure 5:
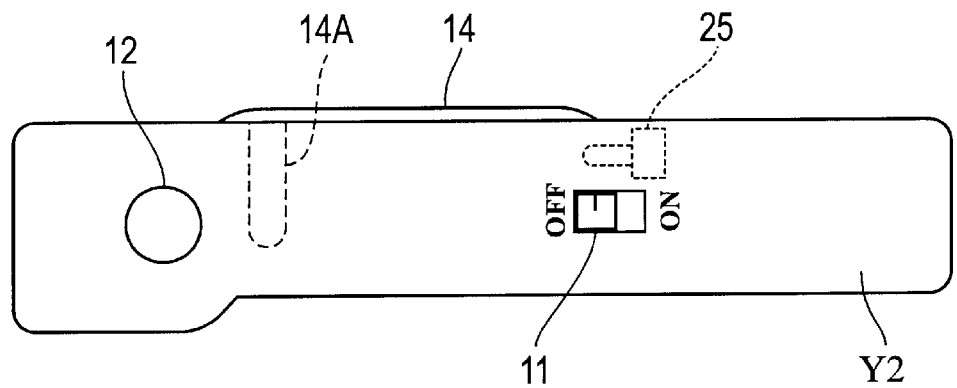
Figure 5:
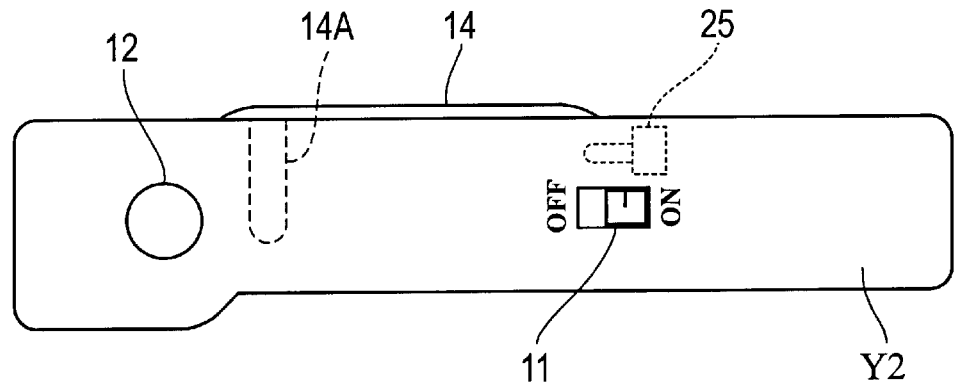
Figure 6:
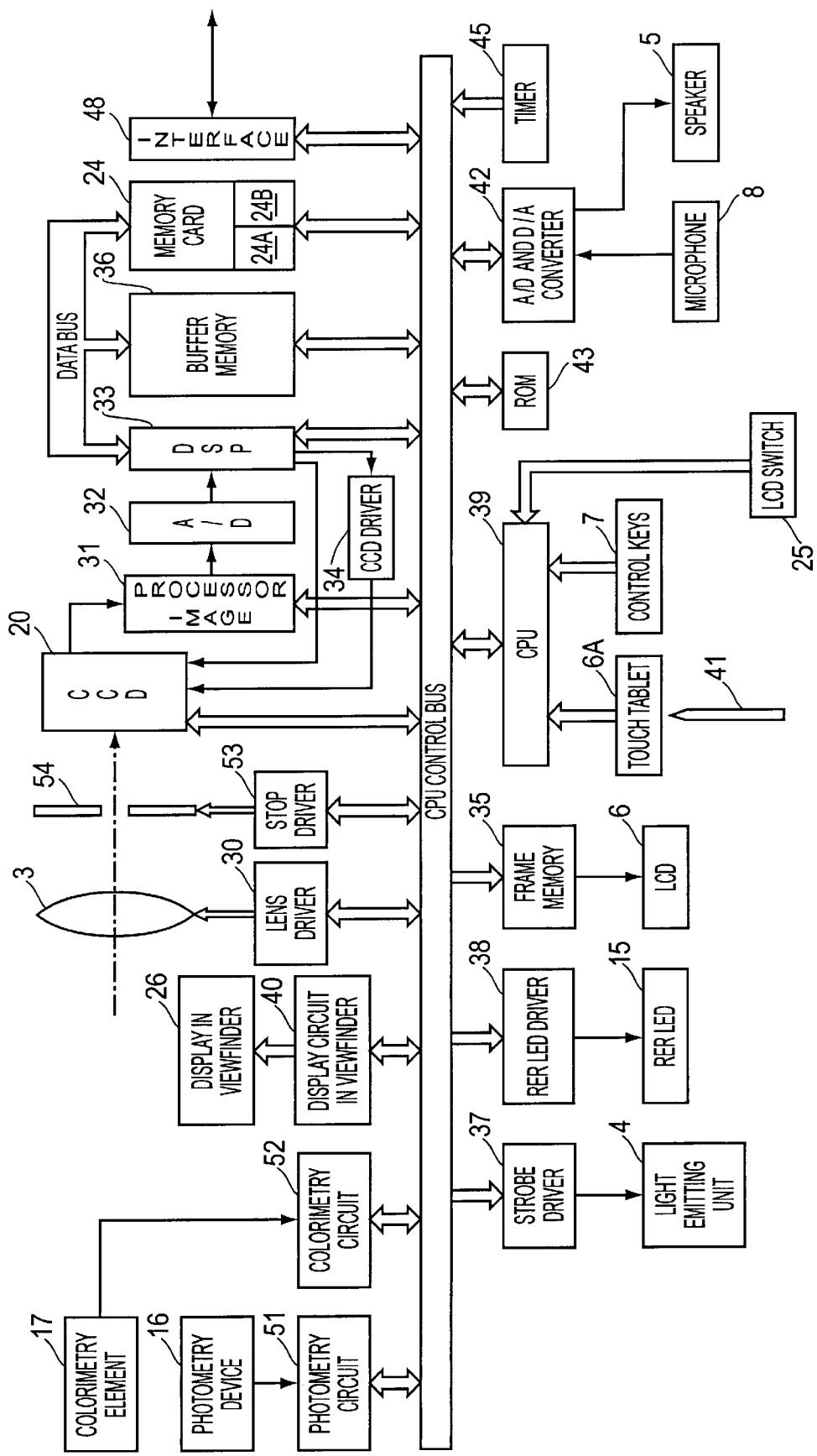
FIG. 6 shows the internal electronic configuration of the electronic camera.

When the LCD cover 14 is moved vertically upward, the power switch 11 can be operated independently of the LCD switch 25 by the user. For example, when the LCD cover 14 is closed and the electronic camera 1 is not used as in FIG. 5B, the power switch 11 and the LCD switch 25 are in the OFF state. In this state, when the user switches the power switch 11 to the ON state as shown in FIG. 5C, the power switch 11 assumes the ON state, but the LCD switch 25 remains in the OFF state. On the other hand, as shown in FIG. 5B, when the power switch 11 and the LCD switch 25 are in the OFF state and when the LCD cover 14 is opened as in FIG. 5A, the power switch 11 and the LCD switch 25 assume the ON state. After that, if the LCD cover 14 is closed, only the LCD switch 25 assumes the OFF state as shown in FIG. 5C.

In at least one preferred embodiment, the memory card 24 is removable; however, memory may be provided on the circuit board 23. Various information can be recorded in the memory. The information recorded in memory (memory card 24) may be output to a personal computer via an interface.

The internal electrical structure of the information input apparatus of one preferred embodiment will now be explained referring to FIG. 4. A CCD 20 having multiple pixels photoelectrically converts the light images into image signals (electrical signals). A digital signal processor (hereafter DSP) 33 provides CCD horizontal drive pulses to the CCD 20 and controls the CCD drive circuit 34 so that the CCD drive circuit 34 provides CCD vertical drive pulses to the CCD 20.

An image processor 31 is controlled by the CPU 39 to sample the image signals photoelectrically converted by the CCD 20 in a predetermined timing and amplify the sampled signals to predefined levels. The CPU 39 controls each part in accordance with a control program stored in ROM (read only memory) 43. An analog/digital conversion circuit (hereafter, A/D conversion circuit) 32 digitizes the image signals sampled by the image processor 31 and provides the digital signals to the DSP 33.

The DSP 33 controls the data bus connected to the buffer memory 36 and memory card 24 and after temporarily storing the image data provided to the DSP 33 from the A/D conversion circuit 32 in the buffer memory 36, it reads the image data stored in the buffer memory 36 and records it in the memory card 24.

The DSP 33 has the image data provided from the A/D conversion circuit 32 stored in the frame memory 35 and displayed to the LCD 6. The DSP 33 also reads out the photographic image data from the memory card 24 and after expanding the photographic image data, has the expanded image data stored in the frame memory 35 and displayed on the LCD 6.

When the electronic camera 1 is started, the DSP 33 repeatedly activates the CCD 20 while adjusting the exposure time (exposure value) until the exposure level of the CCD 20 reaches the proper level. At this time, the DSP 33 activates the photometry circuit 51 and then calculates the initial value of the exposure time of the CCD 20 in response to the photoreceptive level detected by the photometry device 16. Thus, adjustment of the exposure time of the CCD 20 can be shortened.

DSP 33 performs timing management of the data input/output during recording to the memory card 24 and storage to the buffer memory 36 of the expanded image data.

The buffer memory 36 reduces the difference between the speed of data input/output against the memory card 24 and the processing speed in the CPU 39 and the DSP 33.

The microphone 8 is used to input sound information, which is provided to the A/D and D/A conversion circuit 42.

The A/D and D/A conversion circuit 42 converts the analog signals corresponding to the sounds detected by the microphone 8 into digital signals and then provides those digital signals to the CPU 39. The digital signals are converted into analog signals and output to the speaker 5.

The photometry device 16 measures luminosity of the object and the surroundings, and outputs those measurement results to the photometry circuit 51. The photometry circuit 51 applies specified processing to the analog signals (i.e., the photometry results provided by the photometry device 16) and then converts the processed analog signals to digital signals and outputs those digital signals to the CPU 39.

The colorimetry device 17 measures the color temperature of the object and the surroundings and outputs the measurement results to the colorimetry circuit 52. The colorimetry circuit 52 applies specified processing to the analog signals (i.e., the colorimetry results provided by the colorimetry device 17) and then converts the processed analog signals to digital signals and outputs those digital signals to the CPU 39.

The timer 45 has a built-in clock circuit such that it outputs data corresponding to the current time (date and time) to the CPU 39.

The stop drive circuit 53 sets the aperture diameter of the stop 54 to a specified value. The stop 54 is positioned between the photographic lens 3 and the CCD 20 to modify the aperture of the light entering the CCD 20 through the photographic lens 3.

The CPU 39 stops operations of the photometry circuit 51 and the colorimetry circuit 52 when the LCD cover 14 is open based on signals from the LCD switch 25. The CPU 39 further activates the photometry circuit 51 and the colorimetry circuit 52 while suspending action of the CCD 20 (e.g., action of the electronic shutter) until the release switch 10 reaches the half-depressed state when the LCD cover 14 is closed.

The CPU 39 controls the photometry circuit 51 and the colorimetry circuit 52 when the CCD 20 is suspended and receives the photometry results of the photometry device 16 and the colorimetry results of the colorimetry device 17.

The CPU 39 refers to a specified table and calculates the white balance corresponding to the color temperature provided by the colorimetry circuit. The CPU 39 may also provide the white balance adjusted value to the image processor 31.

When the LCD cover 14 is closed, operation of the CCD 20 is suspended because the LCD 6 is not used as an electronic viewfinder. Because the CCD 20 consumes a large amount of electric power, suspending operation of the CCD 20 conserves electric power of the batteries 21.

When the LCD cover 14 is closed, the CPU 39 controls the image processor 31 to execute processing until the release switch 10 is operated (i.e., until the release switch 10 assumes the half-depressed state).

When the LCD cover 14 is closed, the CPU 39 controls the stop drive circuit 53 so as not to change the aperture diameter of the stop 54 until the release switch 10 is operated (i.e., until the release switch 10 assumes the half-depressed state).

The CPU 39 controls the strobe drive circuit 37 to cause the strobe 4 to flash. The CPU 39 also controls the red-eye reduction LED drive circuit (driver) 38 to cause the red-eye reduction LED 15 to emit light prior to firing the strobe 4.

When the LCD cover 14 is open, (i.e., when the electronic viewfinder is being used), the CPU 39 prevents the strobe 4 from flashing. Thus, it is possible to photograph the object in the same state as it is displayed in the electronic viewfinder.

The CPU 39 records date and time information as header information in the photographic image recording area of the memory card 24 based on date and time data provided from the timer 45. In other words, the photographic image data recorded in the photographic image recording area of the memory card 24 contains photographic date and time data.

After the digitized sound information is compressed, the sound data is temporarily stored in the buffer memory 36 by the CPU 39 and is recorded in a specified area (i.e., sound recording area) of the memory card 24. The recording date and time data is recorded as header information of the sound data in the sound recording area of the memory card 24.

The CPU 39 controls the lens drive circuit (driver) 30 to perform autofocus by moving the photographic lens 3. Additionally, the CPU 39 controls the stop drive circuit 53 to change the aperture diameter of the stop 54 positioned between the photographic lens 3 and the CCD 20.

The CPU 39 controls the in-viewfinder display circuit 40 to display the settings of the various actions on the in-viewfinder display 26.

The CPU 39 performs data receipt from external equipment via the interface (I/F) 48.

The CPU 39 may receive signals from operating keys 7 and process them appropriately.

When a specified position of the touch tablet 6A is pressed by a pen (i.e., pen-type pointing device) 41 operated by the user, the CPU 39 acquires the X-Y coordinates of the pressed position, and stores that coordinate data (i.e., the memo information) in the buffer memory 36. The CPU 39 has the stored memo information recorded in the memo information recording area of the memory card 24 along with header information of the memo information input date and time.

Various operations of the electronic camera 1 of a preferred embodiment will now be explained. First, operation of the electronic viewfinder of LCD 6 will be explained.

When the user half-depresses the release switch 10, the DSP 33 determines whether the LCD cover 14 is open based on the signal value provided by the CPU 39 corresponding to the state of the LCD switch 25. When the LCD cover 14 is closed, operation of the electronic viewfinder is not performed and the DSP 33 suspends processing until the release switch 10 is operated.

Because operation of the electronic viewfinder is not performed when the LCD cover 14 is closed, the CPU 39 suspends operations of the CCD 20, the image processor 31 and the stop drive circuit 53. The CPU 39 activates the photometry circuit 51 and the colorimetry circuit 52 and provides those measurement results to the image processor 31. The image processor 31 uses the measurement results when controlling the white balance and brightness.

When the release switch 10 is operated, the CPU 39 activates the CCD 20 and the stop drive circuit 53.

On the other hand, when the LCD cover 14 is open, the CCD 20 performs an electronic shutter action at the specified exposure time for each specified time and photoelectrically converts the optical (light) images of the objects collected by the photographic lens 3 to electric signals. The CCD 20 outputs the image signals obtained through that operation to the image processor 31.

The image processor 31 performs white balance control and brightness control, applies specified processing to the image signals, and then outputs the image signals to the A/D conversion circuit 32. When the CCD 20 is operating, the image processor 31 uses an adjusted value for white balance control and brightness control calculated by the CPU 39 using the output of the CCD 20.

The A/D conversion circuit 32 converts the image signals (analog signals) to digital image data and outputs the digital data to the DSP 33.

The DSP 33 outputs the digital image data to the frame memory 35 and has images corresponding to the digital image data displayed on the LCD 6.

Thus, when the LCD cover 14 is open, operation of the electronic viewfinder is performed such that the CCD 20 performs the shutter action in the specified time interval. Each time the signals output from the CCD 20 are converted to digital image data, the image data is output to the frame memory 35 and images of the objects are continuously displayed on the LCD 6.

When the LCD cover 14 is closed, operation of the electronic viewfinder is not performed, and power consumption is conserved by suspending operations of the CCD 20, image processor 31, and stop drive circuit 53.

Photography of objects will now be explained. First, a mode in which the continuous mode switch 13 (on face Y2) is switched to the S mode (i.e., the mode in which only one frame is photographed) will be explained. When power is supplied to the electronic camera 1 by switching the power switch 11 to "ON," and the release switch 10 (on face Y1) is depressed, photographic processing of the object starts.

When the LCD cover 14 is closed, the CPU 39 reactivates operations of the CCD 20, the image processor 31 and the stop drive circuit 53 when the release switch 10 is in the halfway depressed state. The CPU 39 starts photographic processing when the release switch reaches the fully depressed state.

The light image of the object observed through the viewfinder 2 is collected by the photographic lens 3 and is formed on the CCD 20, which has multiple pixels. The light image formed on the CCD 20 is photoelectrically converted into image signals by each pixel and is sampled by the image processor 31. The sampled image signals are provided to the A/D conversion circuit 32 where they are digitized and output to the DSP 33.

After the image data has been temporarily output to the buffer memory 36, the DSP 33 reads the image data from the buffer memory 36 and compresses it according to the JPEG (Joint Photographic Experts Group) method in which discrete cosine transformation, quantization, and Huffman encoding are applied. The compressed image data is stored in the photographic image recording area of the memory card 24. The photographic date and time data are recorded in the photographic image recording area of the memory card 24 as header information.

When the continuous mode switch 13 is in the S mode, only one frame of photography is performed. Even if the release switch 10 is continuously depressed, subsequent photography is not performed. When the release switch 10 is continuously depressed while the LCD cover 14 is open, the photographed image is displayed on the LCD 6.

A mode in which the continuous mode switch 13 in the L mode (i.e., the mode in which continuous shooting of 8 frames per second is performed) will now be explained. When power is supplied to the electronic camera 1 by switching the power switch 11 "ON", the release switch 10 (on face Y2) is depressed and photographic processing of the object is started.

When the LCD cover 14 is closed, the CPU 39 starts operations of the CCD 20, the image processor 31 and the stop drive circuit 53 when the release switch 10 is in the halfway depressed state, and starts photographic processing when the release switch 10 reaches the fully depressed state.

The light image of the object observed through the viewfinder 2 is collected by the photographic lens 3 and is formed on the CCD 20. The light image on the CCD 20 is photoelectrically converted into image signals by each pixel and is sampled by the image processor 31 at a rate of 8 times per second. The image processor 31 may thin out ¾ of the pixels of the image in the CCD 20.

In other words, the image processor 31 divides the pixels of the CCD 20, which are arranged in a matrix into areas of 2×2 pixels (four pixels) as shown in FIG. 7, and samples the image signal of one pixel from a fixed position of each area while thinning out the remaining three pixels.

For example, during the first sampling (first frame), the top left pixel a of each area is sampled and the remaining pixels b, c, and d are thinned out. During the second sampling (second frame), the top right pixel b is sampled and the remaining pixels a, c, and d are thinned out. Following that, during the third and fourth sampling, the bottom left pixel c and the bottom right pixel d are sampled, respectively, and the other pixels are thinned out. In short, each pixel is sampled every four frames.

Image signals sampled by the image processor 31 (i.e., the image signals of ¼ of the pixels in the CCD 20) are digitized in the A/D conversion circuit 32 and output to the DSP 33.

After the image data has been temporarily output to the buffer memory 36, the DSP 33 reads the image data from the buffer memory 36, compresses it according to the JPEG method, and then stores the compressed image data in the photographic image recording area of the memory card 24. The photographic date and time data is recorded in the photographic image recording area of the memory card 24 as header information.

A mode in which the continuous mode switch 13 is switched to the H mode (i.e., the mode performing continuous shooting of 30 frames per second) will now be explained. When the power switch 11 is switched to "ON"and the release switch 10 is depressed, photographic processing of the object starts.

When the LCD cover 14 is closed, the CPU 39 starts operations of the CCD 20, the image processor 31 and the stop drive circuit 53 when the release switch 10 is in the halfway depressed state and starts photographic processing when the release switch 10 reaches the fully depressed state.

The light image of the object observed through the viewfinder 2 is collected by the photographic lens 3 and is formed on the CCD 20. The light image on the CCD 20 is photoelectrically converted into image signals by each pixel and is sampled by the image processor 31 at a rate of 30 times per second. The image processor 31 thins out 8/9 of the pixels of the image in the CCD 20.

In other words, the image processor 31 divides the pixels of the CCD 20 into areas of 3×3 pixels as shown in FIG. 8 and samples from each area the electrical image signal of one pixel placed in a fixed position at a rate of 30 times per second while thinning out the remaining eight pixels.

For example, during the first sampling (first frame), the top left pixel a of each area is sampled and the other pixels b through i are thinned out. During the second sampling (second frame), the pixel b located to the right of a is sampled and the other pixels a and c through i are thinned out. Following that, during the third sampling and so on, the pixel c, pixel d, etc. . . . , are variously sampled, and the other pixels are thinned out. In short, each pixel is sampled every nine frames.

Image signals sampled by the image processor 31 (i.e., the image signals of ⅑ of all the pixels in the CCD 20) are provided to the A/D conversion circuit 32, and are digitized and output to the DSP 33.

After the image data has been temporarily output to the buffer memory 36, the DSP 33 reads the image data from the buffer memory 36, compresses the image data according to the JPEG method, and then stores the compressed image data in the photographic image recording area of the memory card 24. The photographic date and time data are also recorded in the photographic image recording area of the memory card 24 as header information.

Light can be projected on the objects by operating the strobe 4. However, when the LCD cover 14 is open (i.e., when the LCD 6 is performing the electronic viewfinder operation), then the CPU 39 controls the strobe 4 so as not to flash.

Operations when inputting two-dimensional information (i.e., pen input information) from the touch tablet 6A will now be explained.

When the touch tablet 6A is pressed by the pen tip of the pen 41, the X-Y coordinates of the touched locations are input into the CPU 39 where they are stored in the buffer memory 36. Data is written into the locations within the frame memory 35 corresponding to the X-Y coordinates, and memos corresponding to the contact regions of the pen 41 are displayed on LCD 6.

Because the touch tablet 6A is made of a transparent material, the user can observe points displayed on the LCD 6 in positions where the pen tip of the pen 41 has pressed the touch tablet 6A. Thus, it appears as if the pen 41 inputs data directly on the LCD 6. A line is displayed on the LCD 6 when the pen 41 is moved while contacting the touch tablet 6A. A broken line is displayed on the LCD 6 when intermittently moving the pen 41 on the touch tablet 6A. Thus, the user can input desired memo information such as characters and figures using the touch tablet 6A.

When memo information such as characters are input using the pen 41 while images are displayed on the LCD 6, the memo information is synthesized (combined) in the frame memory 35 along with the image information and is displayed on the LCD 6.

The user can select colors of the memos displayed on the LCD 6 from colors such as black, white, red and blue by operating a palette.

When the execute (run) key 7B is pressed after input of the memo information to the touch tablet 6A, the memo information stored in the buffer memory 36 is provided to the memory card 24 along with the input date and time as header information. It is then recorded in the line-drawing recording area of the memory card 24.

The memo information recorded on the memory card 24 has undergone compression processing. Because the information input into the touch tablet 6A includes a great deal of information of high spatial frequency, when performing compression by the JPEG method, the compression efficiency is poor and the amount of information is not reduced. Furthermore, because compression by JPEG is lossey compression, it is not suitable for compression of line drawings having a small amount of information because gathering and smearing become prominent due to gaps of the information when decompressed and displayed on the LCD 6.

Thus, in at least one preferred embodiment, the memo information is compressed by the run-length method as used by facsimile machines. The run-length method compresses memo information by scanning the line-drawn screen in the horizontal direction and encoding each continuous length of the information of each color and each continuous length of non-information (i.e., the parts having no pen input).

Using this run-length method, the memo information may be efficiently compressed to suppress gaps of information after decompressing the compressed memo information. When the amount of information of the memo information is comparatively small, it need not be compressed.

When memo information is input by the pen 41 while displaying a photographic image on the LCD 6, the photographic image data and the pen-input memo information are synthesized in the frame memory 35 and a composite image is displayed on the LCD 6. Meanwhile, the photographed image data is recorded on the photographic image recording area 24A of the memory card 24 while the memo information is recorded on the memo information recording area 24B of the memory card 24. Because two different types of information are recorded in different areas, the user can delete information (e.g., memo information) from the composite image of the photographed image and the memo. In addition, each type of information can be compressed using an individual compression method.

Figure 9:
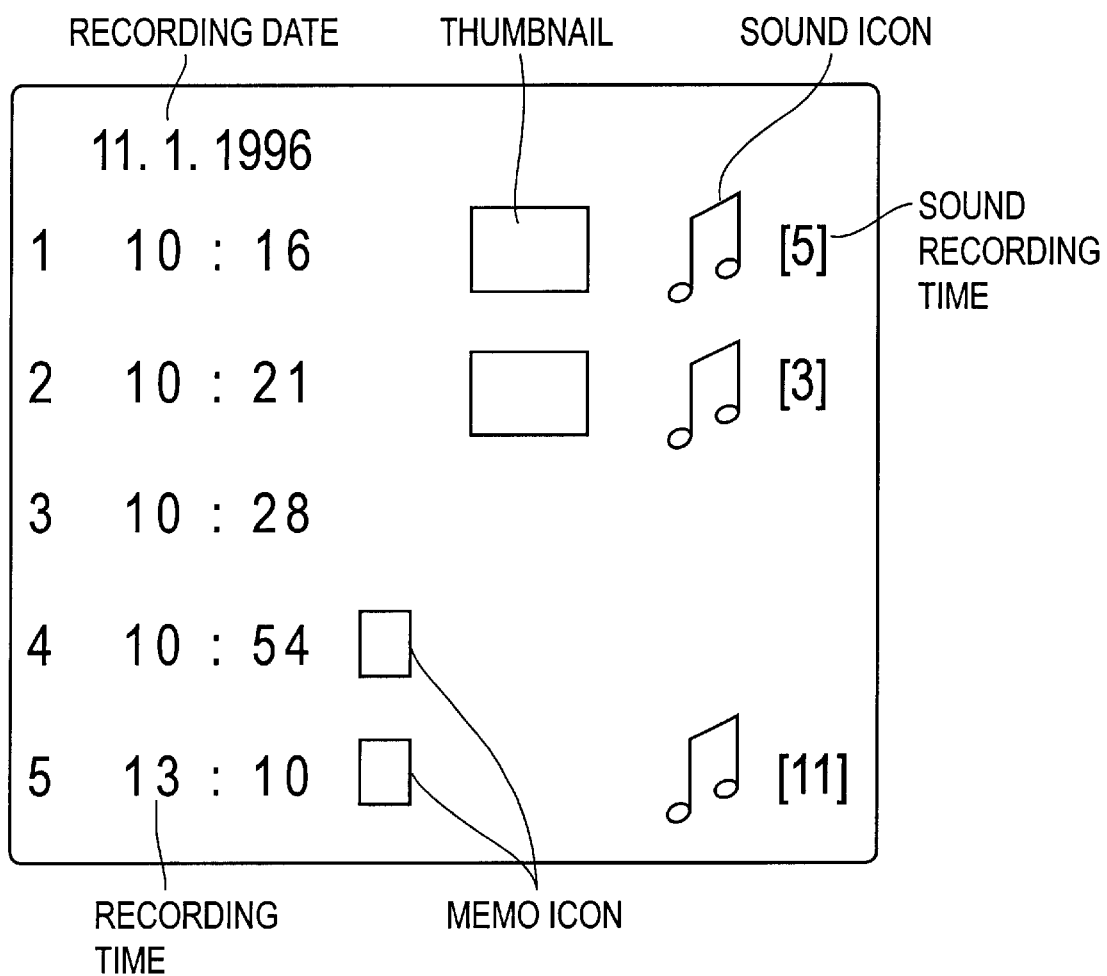
FIG. 9 shows a display screen displayed on the LCD.

When data is recorded in the sound recording area (not shown), the photographed image recording area 24A or the memo information recording area 24B, a list of the recorded data can be displayed on the LCD 6 as shown in FIG. 9.

FIG. 9 shows the date and time of recording on the upper end of the LCD 6 display screen (i.e., Nov. 1, 1996). The recording time may be displayed on the leftmost side of the screen.

Thumbnail images may be displayed on the right side of the recording time. The thumbnail images are reduced images created by thinning out the bit-mapped data of each image data recorded on the memory card 24. In other words, the information recorded at "10:16" and "10:21" includes image information and the information recorded at the other times do not include image data.

The memo icon "[□]" indicates that a memo is recorded as line-drawing information.

A sound icon (musical notes) may be displayed on the right side of the thumbnail image display area. A sound recording time (i.e., number of seconds) is displayed next to the right of the thumbnail image. The sound data is not displayed when sound information is not input.

The user selects the sound information to be reproduced using the pen tip of the pen 41 to press the desired sound icon within the list displayed on the LCD 6, and press the execute key 7B to reproduce the selected information with the pen tip of the pen 41.

For example, when the displayed sound icon at "10:16" (FIG. 9) is pressed by the pen 41, the CPU 39 reads the sound data corresponding to the selected sound recording time (10:16) from the memory card 24. The CPU 39 then expands (decompresses) that sound data and provides it to the A/D and D/A conversion circuit 42. The A/D and D/A conversion circuit 42 converts the sound data to analog signals and then reproduces them using the speaker 5.

When reproducing image data recorded on the memory card, the user selects that information by pressing on the desired thumbnail image with the pen tip of the pen 41, and then presses the execute (run) key 7B.

The CPU 39 instructs the DSP 33 to read the photographic image data corresponding to the recording date and time of the selected thumbnail. The DSP 33 expands the photographic image data (compressed photographic image data) and has the expanded data stored in the frame memory 35 as bit-mapped data and displayed on the LCD 6.

The images photographed in S mode are displayed as still images on the LCD 6. These still images include the image signals of all the pixels of the CCD 20.

The images photographed in L mode are displayed continuously (as moving pictures) at a rate of 8 frames per second on the LCD 6. The number of pixels displayed in each frame is ¼ the total number of pixels of the CCD 20.

Because the human eye reacts sensitively to the degradation of the resolution of still images, thinning out of the pixels of still images is observed as a degradation of image quality by the user. Nevertheless, when the continuous shooting speed during photography rises, 8 frames per second are photographed in L mode and these images are reproduced at a speed of 8 frames per second, the number of pixels of each frame becomes ¼ the number of pixels of the CCD 20. However, because the human eye observes the images at 8 frames per second, the amount of information that enters the human eye in one second is twice that of a still image.

If the number of pixels of one frame of an image photographed in S mode is 1, then the number of pixels of one frame of an image photographed in L mode is ¼. The amount of information that enters the human eye in one second when the image photographed in S mode (still image) has been displayed to the LCD 6 becomes 1=((1 pixel)×(1 frame)). On the other hand, the amount of information that enters the human eye in one second when the images photographed in L mode are displayed to the LCD 6 becomes 2=((¼ pixels)×(8 frames)). In other words, twice as much information of the still image enters the human eye. Consequently, even though the number of pixels in one frame is ¼, the user can observe the reproduced images without noticing degradation of the image quality.

Furthermore, in at least one embodiment, because each frame samples a different pixel and those sampled pixels are displayed to the LCD 6, there is an after-image effect in the human eye. Even though ¾ of the pixels per frame have been thinned out, the user can observe the images photographed in L mode on the LCD 6 without noticing degradation of the image quality.

The images photographed in H mode are continuously displayed on the LCD 6 at a rate of 30 frames per second. The number of pixels displayed in each frame is ⅙ the total number of pixels of the CCD 20. However, for the same reasons as in the L mode, the user can observe the photographed images in H mode without noticing degradation of the image quality.

Because the image processor 31 thins out the pixels of the CCD 20 to the extent that the degradation of the image quality is not noticed when the objects are photographed in L mode and H mode, the load on the DSP 33 can be reduced. The DSP 33 can therefore operate at low speed and low power. It is therefore possible to reduce the cost and power consumption of the apparatus.

It is possible to photograph light images of objects and to record memo (line-drawing) information. In the preferred embodiments, these modes are appropriately selected according to operations of the user so that so that the input of information can be performed smoothly.

Figure 10:
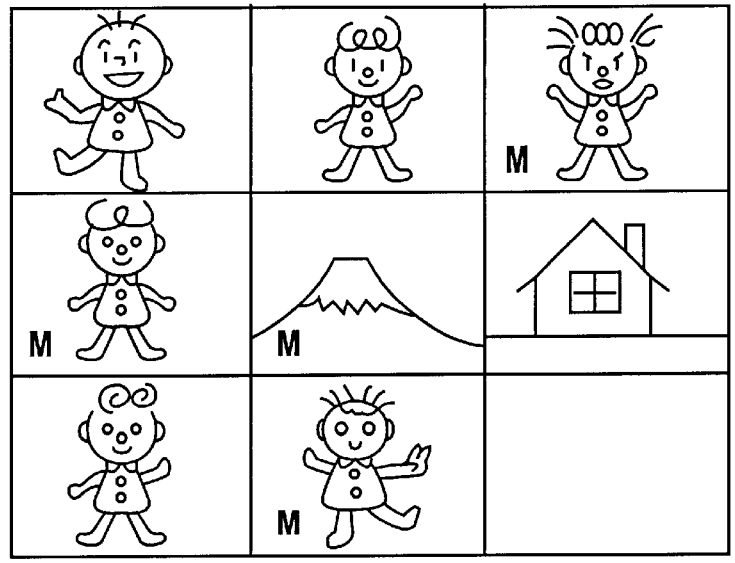
FIG. 10 shows a nine-portioned screen and four memo marks.

FIG. 10 shows the display when the screen is divided into nine areas and an image is displayed in each area. It is possible to have the number of areas into which the screen is divided, for example, correspond to the number of selected images. For example, the screen can be divided into $n^2$ areas by defining n as any natural number, and obtaining n in which the number of selected images is larger than $(n-1)^2$, and equal to or less than $n^2$. In this example, because eight images are selected, the number 3 is obtained as the value of n. Accordingly, the screen is divided into 9 (=$3^2$) areas. Because the size of each area is comparatively small and the number of pixels in those areas is comparatively few, memos cannot be discriminated when displayed. Accordingly, a memo mark "M" is displayed indicating the existence of the memo information.

When the user indicates to display multiple images and then presses the execute (run) key 7B, the CPU 39 divides the screen of the LCD 6 into the specified number of areas according to the number of images selected, and displays each selected image in an area of the divided screen. When memo information (line-drawing information) related to the images has been stored on the memory card 24, the CPU 39 determines whether to display that memo information based on the number of pixels and the sizes of the divided areas.

Because the screen is divided into nine areas, the size of each area is comparatively small and the number of pixels in those areas is comparatively few. Further, because it is not possible to discriminate the memos when displayed, the display of the memos is not performed. This discrimination by the CPU 39 may be predefined by the user.

Because the screen of the LCD 6 is comparatively large, and the resolution is high, if it is possible to discriminate the memos displayed in each area of a nine-partitioned screen, it may be defined to display the memos also when the screen is divided into nine, and it may be defined to not display the memos when the screen is divided into sixteen.

For the image on the upper right side of FIG. 10, a memo mark "M" is displayed to the left below the image indicating that related memo information has been stored. In the same manner, a memo mark "M" is displayed for the images on the center left and in the center, respectively. Furthermore, a memo mark "M" is displayed for the image at the bottom center.

Figure 11:
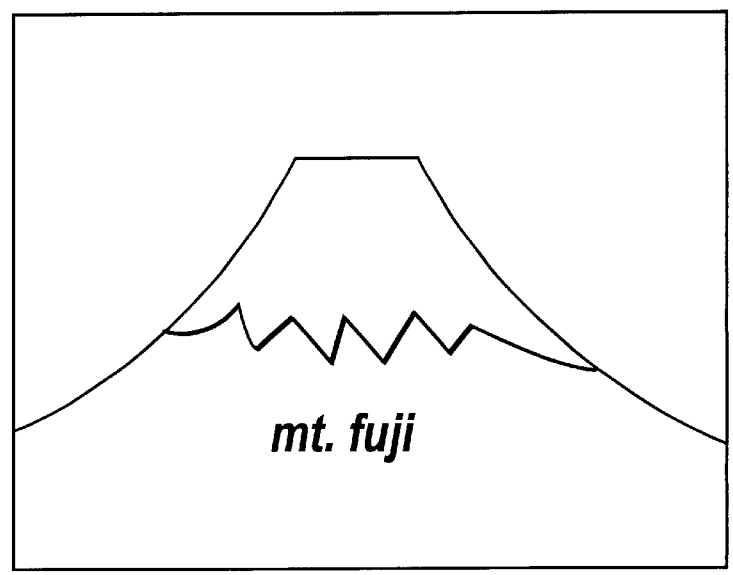
FIG. 11 shows a display of the center image of FIG. 10.

Because the memo marks "M" are displayed, the user can recognize that memo information has been stored related to the images for which the memo marks "M" are displayed. When wishing to view the memo related to a specified image, the image is selected using the pen 41 and the execute (run) key 7B is selected. Thus, the selected image is displayed on the entirety of the screen as shown in FIG. 11, and the related memo is displayed superimposed on the image.

Figure 12:
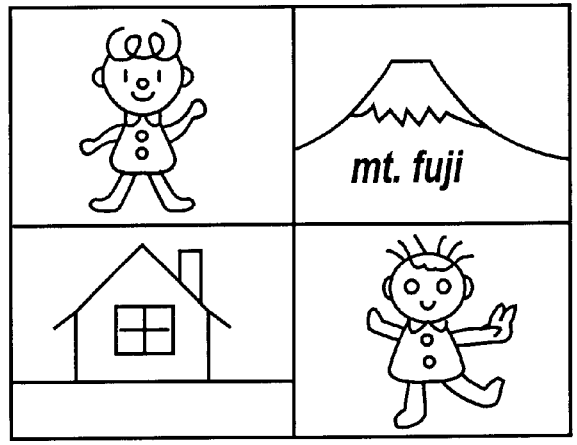
FIG. 12 shows a four-partitioned screen.

FIG. 12 shows an example of a screen having images displayed in each area of a four-partitioned screen. Because the size of each area is comparatively large and the number of pixels in those areas is comparatively many, it is possible to discriminate the memos when displayed so that if there is memo information, it is displayed.

When multiple images are selected by the user and their display has been indicated, the CPU 39 divides the screen of the LCD 6 into the specified number of areas according to the number of images selected and has the images displayed in each area of the divided screen at a reduced size. When memo information related to the images displayed in each area has been stored on the memory card 24, the CPU 39 determines whether to have them displayed based on the number of pixels and the sizes of each area of the divided screen. In the present case, because the screen has been divided into four areas, it is possible for the CPU 39 to display the memos.

In FIG. 12, memo information related to the two top images is displayed.

Figure 13:
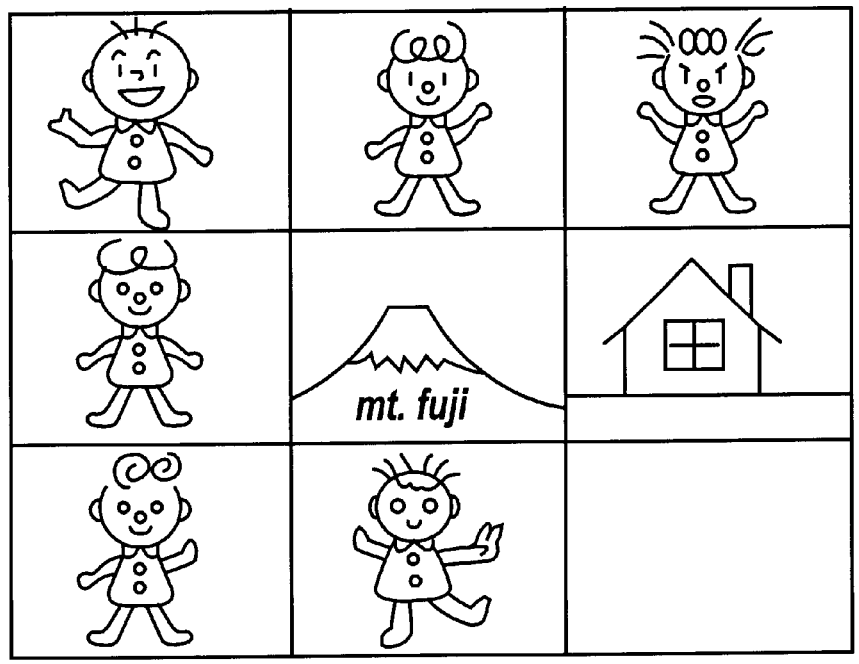
FIG. 13 shows a nine-partitioned screen when the overall screen is comparatively large.

FIG. 13 shows an example when the entirety of the screen of the LCD 6 is comparatively large. Thus, when the entire screen is comparatively large and the number of pixels of the entirety is many, it is possible to discriminate the memos even when a memo is displayed in each area of a nine-partitioned screen so that when memo information has been stored, the memos are displayed superimposed on the images. Of course, when only the memo information has been stored, only the memo information is displayed.

Figures 14, 14A:
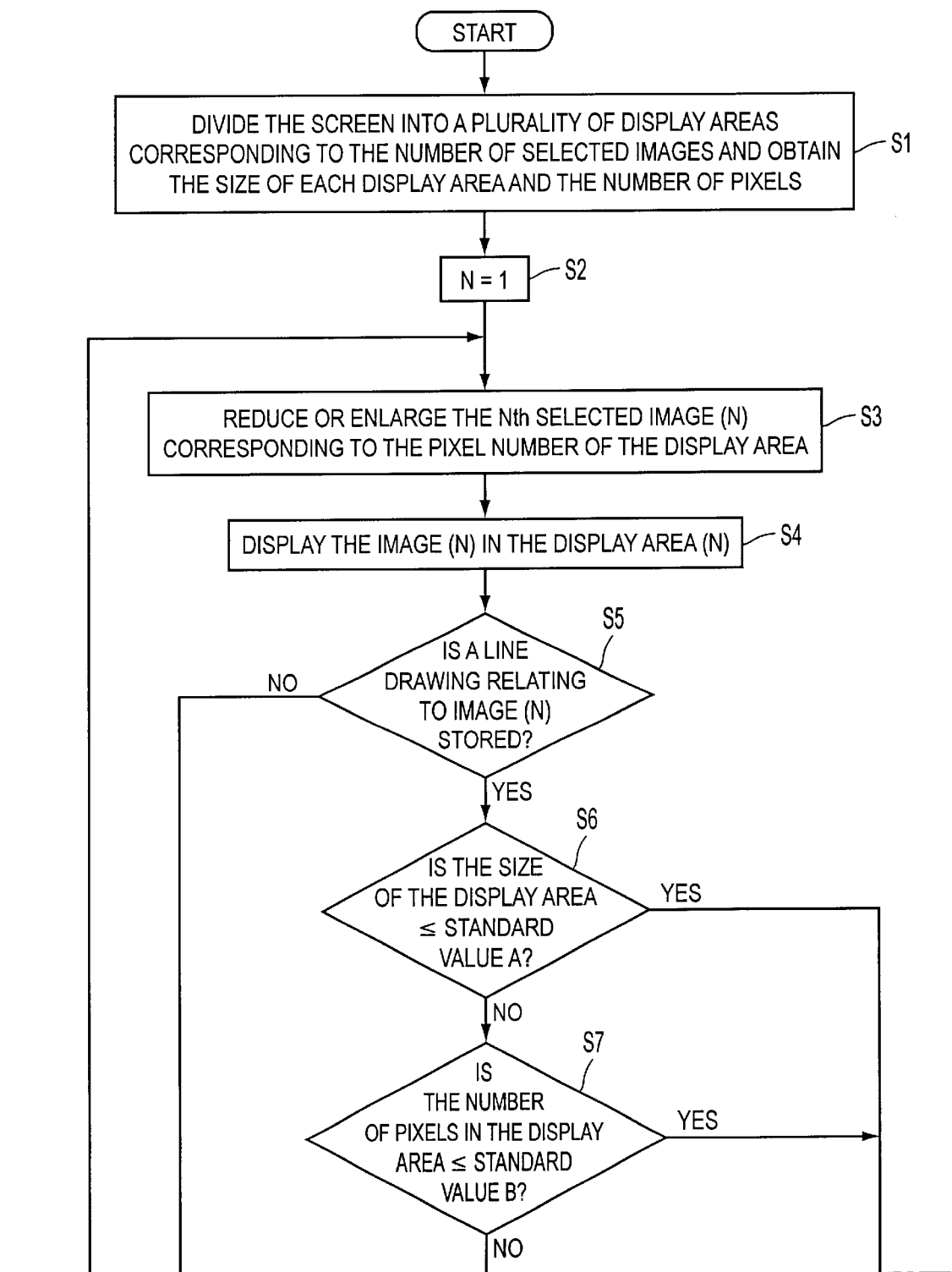
FIG. 14 is a flowchart describing the procedure that controls whether a line drawing is displayed.
Figure 14B:
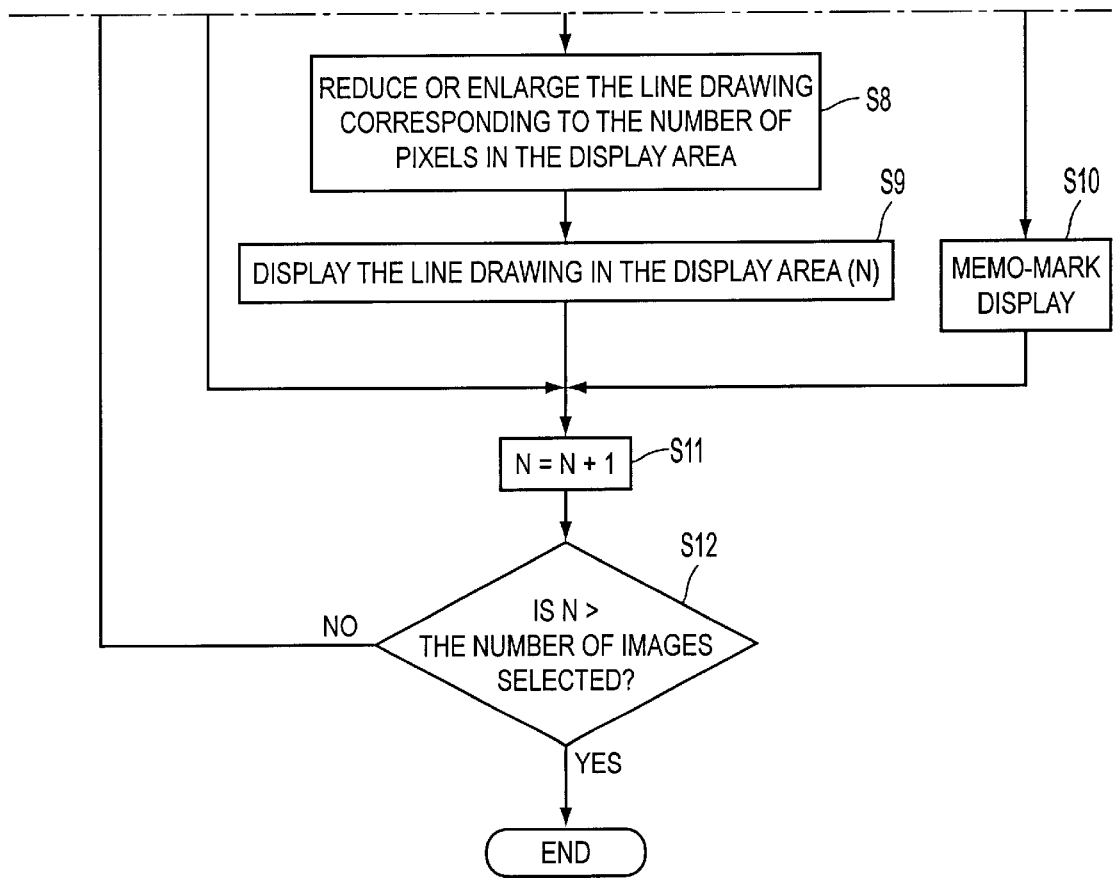

FIG. 14 will now be used to explain an example of when a selected plurality of images are displayed in a plurality of display areas and when a line drawing related to a respective image is stored on the memory card 24. In other words, FIG. 14 is a processing procedure that controls whether to display the line drawing.

In step S1, the size of the plurality of display areas into which the screen is divided corresponding to the number of selected images, and the pixel number in each display area, are obtained by the CPU 39. In step S2, the value 1 is inserted for the variable N, which will be used for controlling the process circuit.

In step S3, the Nth selected image is reduced or enlarged corresponding to the pixel number of the display areas using the CPU 39, DSP 33 or the like.

In step S4, the image (N) reduced or enlarged in step S3 is displayed in an Nth display area. Next, in step S5, the CPU 39 determines whether a line drawing related to the displayed image (N) is stored on the memory card 24.

When the line drawing related to the image (N) is stored on the memory card 24, the process advances to step S6. In step S6, it is determined whether the size of the display area is equal to or less than a predetermined (standard) reference value A. When the size of the display area is not equal to or less than a predetermined standard value A, the process advances to step S7, where it is determined whether the pixel number in the display area is equal to or less than a predetermined (standard) reference value B. When the pixel number in the display area is not equal to or less than the predetermined reference value B, operation advances to step S8.

In step S8, via control of the CPU 39, a line drawing relating to image (N) is read from the memory card 24 and enlarged or reduced based on the size of the display area. In step S9, the line drawing that was enlarged or reduced in step S8 is displayed in the display area (N).

If the size of the display area is determined in step S6 to be less than the predetermined reference value A, or if a value expressing the number of pixels of the display area is determined in step S7 to be below the predetermined reference value B, operation advances to step S10 and a memo mark "M" may be displayed at the lower left of the display area using the CPU 39.

If a line drawing relating to an image (N) is not stored on the memory card 24 in step S5, or if the procedures of steps S9 and/or S10 end, operation advances to step S11 where the variable N is incremented by 1. In step S12, it is determined whether the value of variable N is larger than the number of selected images. If the variable N is less than or equal to the number of selected images, operation returns to step S3 and repeats the procedure starting from step S3.

Meanwhile, when variable N is greater than the number of images selected (i.e., when the above process for all selected images is determined to be completed) all processing is completed.

In this manner, it is determined whether to have the memo information displayed based on the size of the screen of the LCD 6, the number of divisions, and the resolution (number of pixels). When it is not possible to discriminate the memos when displayed, they are not displayed. Instead, marks indicating that the memo information exists are displayed. Thus, it is possible to prevent the screen from becoming hard to view and to increase the ease of use.

When selecting information from the list displays and when the screen is divided into nine, for example, useless operations by the user may be prevented by making it impossible to select ten or more items of information.

The program performed by the CPU 39, such as the processing shown in FIG. 14, may be stored in ROM 43 of the electronic camera 1, on the memory card 24, or the like. In addition, it is also acceptable for the program to be provided to the user as stored previously in the ROM 43 or memory card 24. It is further acceptable if it is provided to the user as stored on a CD-ROM (compact disk-read only memory) or the like, with copy-capability to the ROM 43 or memory card 24. In such a case, the ROM 43 may be an electrically rewriteable EEPROM (electrically erasable and programmable read only memory) or the like. The program also can be provided to the user over a communications network such as the Internet (World Wide Web).

The above examples have the screen divided into four or nine areas such that images and memos are displayed in each area. However, the present invention it is not limited to these examples and it is possible to divide the screens into any number of areas (e.g., $n^2$ areas where n is a natural number), and display the images and memos in each area.

It is further possible to apply the present invention even when dividing the screens of other display devices, and displaying multiple images and memos on them.

It is also possible to select information in which only a line drawing is included, from the display screen on which the list of FIG. 9 is displayed. According to the size of the display area or pixel number, it can display only the memo mark "M" in the corresponding display area or display only a line drawing in the corresponding display area.

A display control device may have a first mode having the first images displayed on the screens in a first size corresponding to a first number of pixels and a second mode having the first images displayed on the screens in a second size corresponding to a second number of pixels less than the first number of pixels. When the first images have been displayed on the screens in the first mode and when the second images related to the first images are stored in memory, the second images are displayed superimposed on the first images. Therefore, it is possible to determine whether to have a second image displayed based on the size and the number of pixels of the display screen. In this manner, it is possible to make the screen easier to view by not having unrecognizable images displayed.

The display control device may be capable of having the first images displayed in a plurality of sizes. The display control device may control whether to display the second images superimposed on the first images according to sizes in which the first images are displayed. Therefore, it is possible to determine whether to have a second image displayed based on the size and the number of pixels of the display screen. In this manner, it is possible to make the screen easier to view by not having unrecognizable images displayed.

A program may be recorded such that the information processing apparatus operates in one of a first mode in which the first image is displayed on the screen in a size corresponding to a first pixel number, and a second mode in which the first image is displayed on the screen in a second size corresponding to a second pixel number smaller than the first pixel number. The information processing apparatus may be controlled such that, if the first image is displayed on the screen in the first mode and the second image related to the first image is stored in memory, then the second image is displayed on the screen superimposed on the first image. As a result, it is possible to determine whether to display a second image based on the size of the display screen or the pixel number. As a result, an unrecognizable image will not to be displayed on the screen, making viewing of the screen easier.

Although the JPEG and run length encoding compression techniques were described, other compression techniques (or no compression at all) can be used with the invention.

Although a touch tablet with input pen is described as structures through which selections and commands can be input, the invention is not limited to such structure. For example, the touch tablet can be actuable by the user's finger. Additionally, selections and commands can be input without using a touch tablet. For example, a cursor can be moved (e.g., via a mouse) and selections or commands can be made by clicking.

The invention is not limited to implementation by a programmed general purpose computer as shown in the preferred embodiment. For example, the invention can be implemented using one or more special purpose integrated circuit(s) (e.g., ASIC). It will be appreciated by those skilled in the art that the invention can also be implemented using one or more dedicated or programmable integrated or other electronic circuits or devices (e.g., hardwired electronic or logic circuits such as discrete element circuits, or programmable logic devices such as PLDs, PLAs, PALs or the like).

While the invention has been described in relation to preferred embodiments, many modifications and variations are intended to be within the scope of the present invention as defined in the appended claims.

What is claimed is:

1. An information processing apparatus comprising:
   storage means for storing first images and second images; and
   display control means for displaying said first images and said second images on a screen, wherein said display control means includes a first mode in which said first images are displayed on said screen in a first size corresponding to a first number of pixels and a second mode in which said first images are displayed on said screen in a second size corresponding to a second number of pixels less than said first number of pixels, said display control means displaying said second images superimposed with said first images based on a determination of whether said first images are displayed on said screen in said first mode or said second mode such that, when said second images are stored in said storage means related to said first images, said second images are displayed superimposed with said first images in only one of said first and second modes.

2. The information processing apparatus of claim 1, wherein said display control means displays a symbol on said screen superimposed on said first images indicating the existence of said second images related to said first images when the first images are displayed on the screen in the second mode and said second images are stored by said storage means related to said first images.

3. The information processing apparatus of claim 1, wherein said first images are displayed in a plurality of display areas of said screen when displaying a plurality of said first images on said screen; and
   said display control means determines whether said second images related to said first images are displayed based on sizes of said display areas when said second images are stored in said storage means related to said first images.

4. The information processing apparatus of claim 1, wherein said display control means determines whether to have said second images displayed superimposed on said first images based on sizes of display areas when said first images are displayed on said screens.

5. The information processing apparatus of claim 1, wherein said first images are photographic images and said second images are line drawings.

6. The information processing apparatus claim 1, further comprising display means for displaying said first images and said second images.

7. The information processing apparatus of claim 1, wherein said display control means does not display one of said second images when a size of said one second image, at a time said first image is displayed, is equal to or less than a first reference value or when a number of pixels for displaying said first image is equal to or less than a second reference value.

8. An information processing apparatus comprising:
   display means for displaying first images and second images; and
   display control means for controlling said display means and being capable of displaying said second images superimposed on said first images, wherein said display control means displays said first images in a plurality of sizes, and said display control means determines whether or not to cause the display means to display said second images superimposed with said first images based on sizes in which said first images are displayed.

9. The information processing apparatus of claim 8, wherein said display control means displays a symbol on said screen which is superimposed on said first images indicating the existence of said second images related to said first images when said first images are displayed on said screen without superimposing said second images thereon and said second images are stored by said storage means related to said first images.

10. The information processing apparatus of claim 8, wherein said first images are displayed in a plurality of display areas of said display means when displaying a plurality of said first images; and
    said display control means determines whether said second images related to said first images are displayed based on sizes of said display areas when said second images are stored in said storage means related to said first images.

11. The information processing apparatus of claim 8, wherein said display control means determines whether to have said second images displayed superimposed on said first images based on sizes of a display areas when said first images are displayed.

12. The information processing apparatus of claim 8, wherein said first images are photographic images and said second images are line drawings.

13. The information processing apparatus of claim 8, wherein said display control means does not display one of said second images when the size of said one second image, at a time said first image is displayed, is equal to or less than a first reference value or when a number of pixels for displaying said first image is equal to or less than a second reference value.

14. An information processing apparatus comprising:
    a memory that stores first images and second images; and
    a display controller, connected to said memory, to display said first images and said second images on a screen of a display, wherein said display controller includes a first mode in which said first images are displayed on said screen in a first size corresponding to a first number of pixels and a second mode in which said first images are displayed on said screen in a second size corresponding to a second number of pixels less than said first number of pixels, said display controller displaying said second images superimposed with said first images based on a determination of whether said first images are displayed on said screen in said first mode or said second mode such that, when said second images are stored in said memory related to said first images, said second images are displayed superimposed with said first images in only one of said first and second modes.

15. The information processing apparatus of claim 14, wherein said display controller device displays a symbol on said screen superimposed on said first images indicating the existence of said second images related to said first images when the first images are displayed on the screen in the second mode and said second images are stored by said memory related to said first images.

16. The information processing apparatus of claim 14, wherein said display controller displays said first images in a plurality of display areas of said screen when displaying a plurality of said first images on said screen; and said display controller determines whether said second images related to said first images are displayed based on sizes of said display areas when said second images are stored in said memory related to said first images.

17. An information processing apparatus comprising:

a display that displays first images and second images; and a display controller coupled to the display to control said display to display said second images superimposed on said first images wherein said display controller displays said first images in a plurality of sizes, and said display controller determines whether or not to cause the display to display said second images superimposed with said first images based on sizes in which said first images are displayed.

18. A recording medium that stores a computer-readable control program having instructions that are executable by an information processing apparatus to perform the steps of:

storing a first image and a second image in memory;

displaying said first image and said second image on a screen; and controlling the screen to operate in one of a first mode in which said first image is displayed on said screen in a size corresponding to a first pixel number, and a second mode in which said first image is displayed on said screen in a second size corresponding to a second pixel number smaller than said first pixel number, wherein said control program controls the screen such that said second image is displayed on said screen superimposed with said first image based on a determination of whether said first image is displayed on said screen in said first mode or said second mode such that, when said second image is stored in said memory related to said first image, said second image is displayed superimposed with said first image in only one of said first and second modes.

19. The recording medium of claim 18, wherein the control program further includes instructions to display a symbol on said screen superimposed on said first image indicating the existence of said second image related to said first image when the first image is displayed on the screen in said second mode and said second image is stored in said memory related to said first image.

20. The recording medium of claim 18, wherein the control program further includes instructions to:

display said first images in a plurality of display areas of said screen when displaying a plurality of said first images on said screen; and to determine whether a plurality of said second images related to said first images are displayed based on sizes of said display areas when said second images are stored in said memory related to said first images.

21. A recording medium that stores a computer-readable control program having instructions that are executable by an information processing apparatus to perform the steps of:

determining whether a first image has been selected for display;

determining a display size by which the first image will be displayed;

determining whether a second image is related to the first image; and displaying the second image superimposed with the first image only when the display size is larger than a reference value.

22. The recording medium of claim 21, wherein the control program further includes instructions to display a mark along with the first image when the display size is not larger than the reference value.

23. A method of controlling an information processing apparatus, the method comprising the steps of:

determining whether to display at least one first image in a first mode in which said at least one first image is displayed in a first size corresponding to a first number of pixels, or in a second mode in which said at least one first image is displayed in a second size corresponding to a second number of pixels; and superimposing a second image with said at least one first image based on a determination of whether said first images are in said first mode or said second mode such that, when said second image is related to said at least one first image, said second image is displayed superimposed with said at least one first image in only one of said first and second modes.

24. The method of claim 23, further comprising the step of displaying a symbol superimposed with said at least one first image indicating the existence of said second image related to said at least one first image when in said second mode and said second image is related to said at least one first image.

25. The method of claim 23, further comprising the steps of:

displaying a plurality of said first images in a plurality of display areas; and determining whether any second images related to said first images are displayed based on sizes of said display areas.

26. A method of controlling an information processing apparatus, comprising the steps of:

determining whether a first image has been selected for display;

determining a display size by which the first image will be displayed;

determining whether a second image is related to the first image; and displaying the second image superimposed with the first image only when the display size is larger than a reference value.

27. The method of claim 26, further comprising displaying a mark along with the first image when the display size is not larger than the reference value.

* * * * *